United States Patent [19]

Cocatre-Zilgien

[11] Patent Number: 5,707,038
[45] Date of Patent: Jan. 13, 1998

[54] HINGED KINK VALVE

[76] Inventor: Jan H. Cocatre-Zilgien, 802 E. California Ave., Urbana, Ill. 61801-4342

[21] Appl. No.: 736,335

[22] Filed: Oct. 23, 1996

[51] Int. Cl.$^6$ ............................................. F16K 1/22
[52] U.S. Cl. ........................................ 251/4; 251/9
[58] Field of Search ............................ 251/4, 9, 10

[56] References Cited

U.S. PATENT DOCUMENTS

| | | | |
|---|---|---|---|
| 470,776 | 3/1892 | Beehler . | |
| 2,002,835 | 5/1935 | Rose | 137/20 |
| 2,716,013 | 8/1955 | Tinker | 251/4 |
| 2,995,334 | 8/1961 | Henderson et al. | 251/4 |
| 3,103,335 | 9/1963 | Martinez | 251/4 |
| 3,190,497 | 6/1965 | Anthon | 222/64 |
| 3,329,389 | 7/1967 | Clark | 251/4 |
| 3,395,838 | 8/1968 | Beres et al. | 222/479 |
| 4,080,989 | 3/1978 | Chapelsky et al. | 251/4 X |
| 4,354,660 | 10/1982 | Stupar et al. | 251/4 |
| 5,042,526 | 8/1991 | Kulakoff | 137/451 |
| 5,370,279 | 12/1994 | Tardif | 251/9 X |
| 5,402,823 | 4/1995 | Cole . | |

*Primary Examiner*—John Fox

[57] ABSTRACT

A two-way flexible valve to control or interrupt the flow of a pressurized medium. The valve is a polymeric semi-rigid tubing hyperflexed until its material has yielded in an irreversible manner and created a kink. Ulterior flexions of the tubing tend to occur about the preferred axis set by the kink. An acute angle closes the valve by crimping the lumen shut, whereas an obtuse angle opens it in some proportion of the angle. One end of the kinked valve tubing is held on a support and the other end is fastened to a lever hinged on pivot pins. The distance between holding points and the valve kink is several times the diameter of the valve tubing, and the axis of the kink is collinear with that of the hinge, both factors reducing sideload stress in the valve material, increasing its lifespan. An elastic member holds the valve closed and a flexible actuating line acting against the elastic member opens the valve in some proportion of its pull. A three-way valve embodiment is detailed for the control of pneumatic actuators of a walking robot.

13 Claims, 2 Drawing Sheets

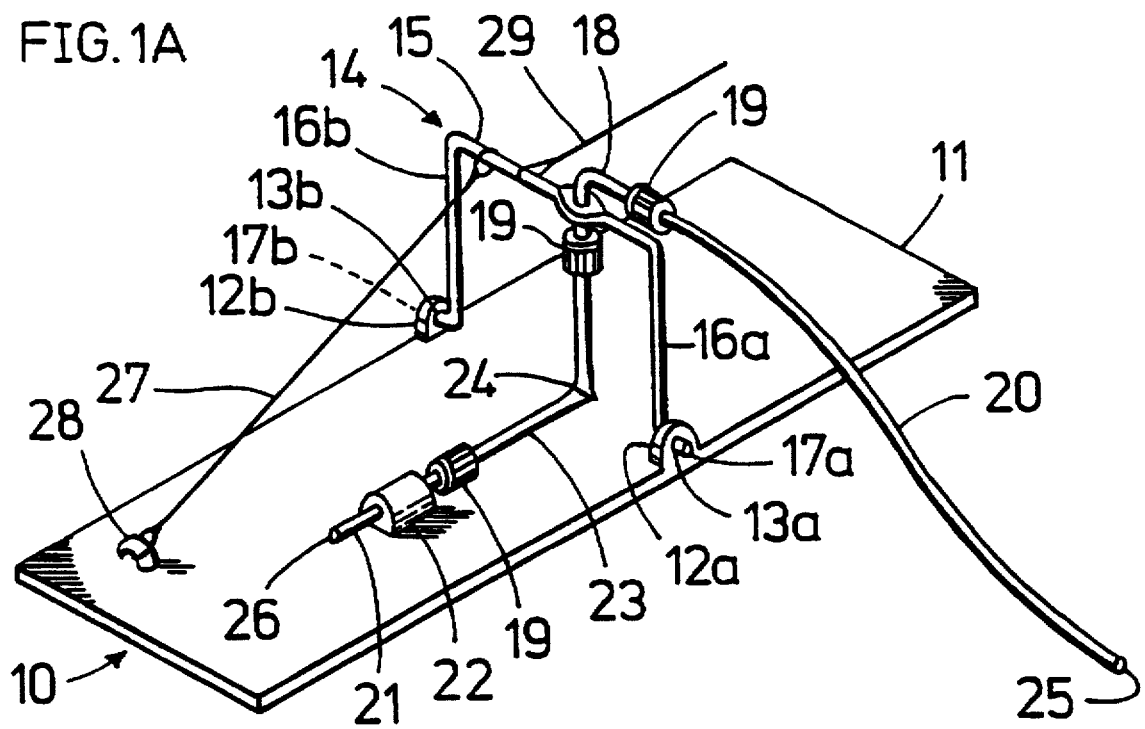
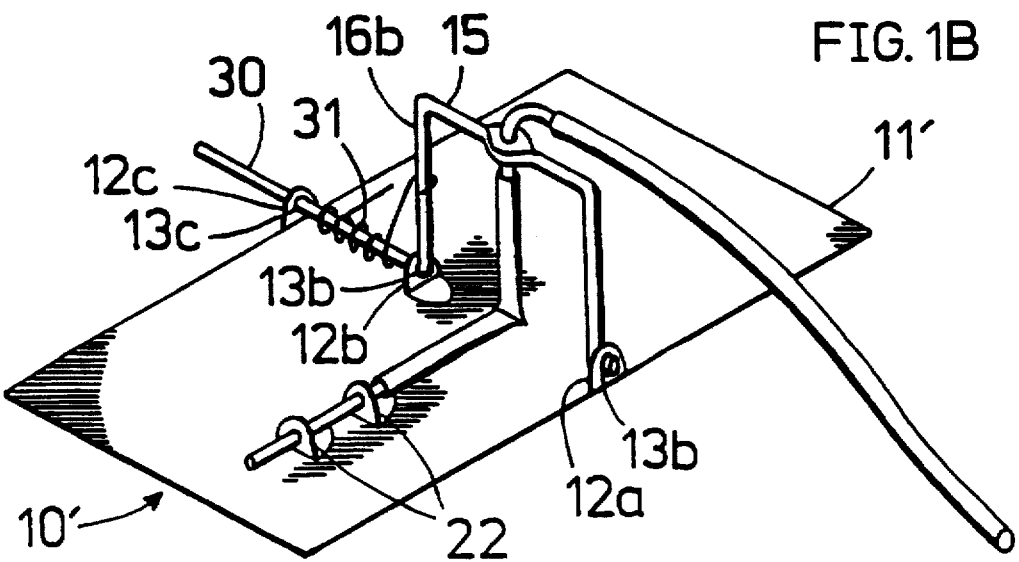

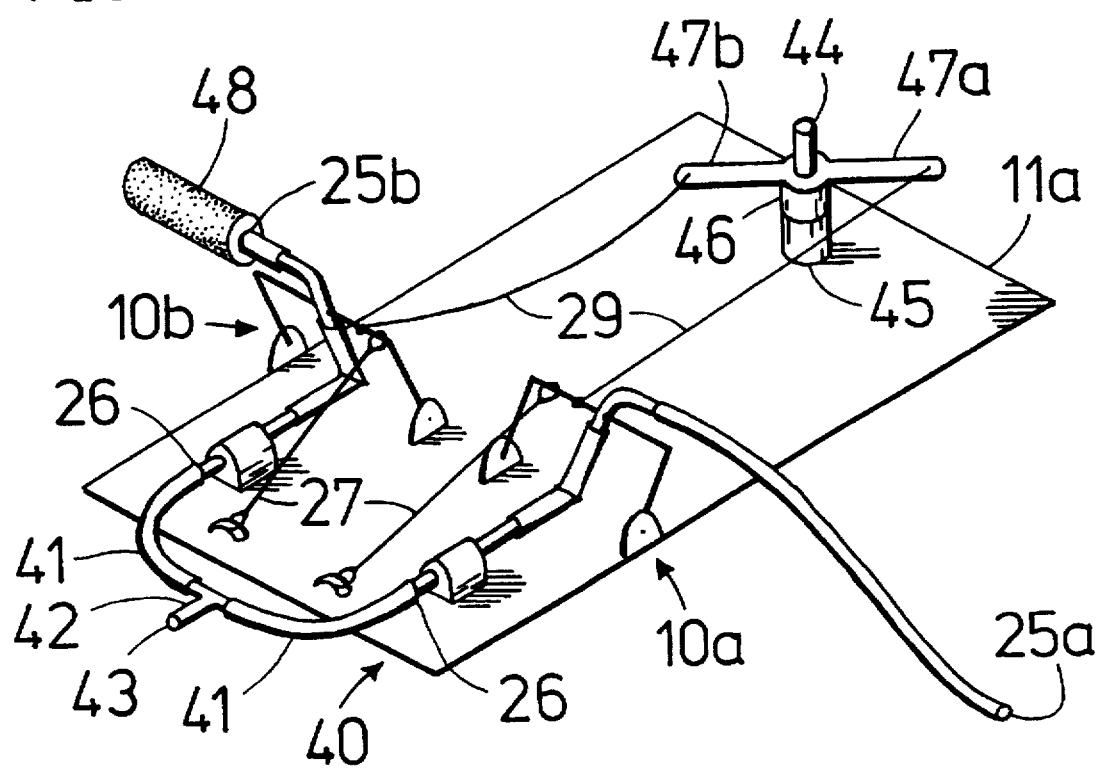

HINGED KINK VALVE

BACKGROUND

1. Field of the Invention

This invention relates to the general field of valves for controlling the flow of a medium, more specifically to flexible valves where a controllable bend of a flexible conduit constitutes the valve.

2. Prior Art

There are many flexible valves in the prior art. The material used for the wall of conduits in flexible valves is generally a resilient elastomeric compound from a group consisting of latex, polyvinylchloride, polyurethane and silicone.

However, a flexible conduit that is too compliant to hold its shape on its own when flexing forces are applied to it needs to be braced by some external rigid structure. This structure around a flexible valve complicates its design and operation and exposes it to potentially catastrophic jams. Furthermore, flexible valves made of resilient material need to be operated by external rigid throttles or chokes to crimp shut the lumen of the conduit, which otherwise would be too resilient to prevent the medium from flowing through, especially under pressure. If the valve is to be used repeatedly, these external rigid parts would chafe the flexible conduit wall and damage it to the point of failure. As most flexible valves are designed to be disposable or have a short lifespan, there is generally no provision for them to be adequately maintained or repaired.

Furthermore, most flexible valves can only withstand a relatively low pressure of the medium they are to control because of the compliance of the material from which they are made. The above-mentioned limitations are not a factor for single-use valves that clamp medical catheters or those which control some low-pressure laboratory tubing, but are significant restrictions that preclude their application to the many fields where they could be operated repeatedly at higher pressures.

Also, many flexible valves are designed to be operated manually and are difficult to convert for operation by other means, for example by a controlling device such as a servomechanism. Finally, flexible valves operated by a control device are generally designed to have an on-off type of operation akin to that of solenoid valves, without provision for gradation in the flow of the medium they control.

These and other reasons explain why flexible valves are seldom encountered, among others, in the field of robotics, mechatronics and animatronics.

OBJECT AND ADVANTAGES

It is the general object of the invention to provide an improved flexible valve to control the flow of a medium, which avoids the disadvantages of prior flexible valves while affording additional structural and operating advantages.

The valve of the present invention comprises very few parts, which can be made of inexpensive materials. These parts have simple shapes which can be easily manufactured for mass production. As a result, the valve is of economical construction. Also, maintenance costs are small and stem only from the replacement of a single and inexpensive part.

All the valve parts can be made out of plastic material and as a consequence are light in weight. Also, plastic material used in flexible valves is generally impervious to corrosion.

The valve of the present invention can be operated in a gradated way from an hermetically closed state to a nearly full-bore open state in a continuously adjustable manner. It possesses a large bandwidth which is desirable for controlling the flow of a medium, and needs little actuating power in comparison to the flow it can allow to pass through. Moreover, the valve of the present invention can always be positively moved to an open or closed condition without stiction. In particular, it cannot be jammed open or closed.

When the valve of the present invention is in the fully open state, the cross-section available to the flow of the medium has generally the same area as that of the conduit connected to the valve. Also in the open state, the direction of the flow does not change direction abruptly and this therefore reduces the risk of undesirable turbulence or cavitation of the medium. As a consequence of these two factors, in its open state, the valve does not constitute a significant restriction to the flow. Furthermore, any impurities in the medium can be blown through by full opening of the valve, which confers to the present invention a self-cleaning property that is very useful with inhomogeneous media.

A very significant advantage of the valve of the present invention is its capacity to withstand pressures generally in excess of 700 kPa (100 PSI). This advantage alone allows the extension of the use of flexible valves to the control of fluid-powered actuators.

The valve of the present invention has self-aligning properties owed to its general design, which minimize the stress it is submitted to and extends its lifespan. The valve can be built and operated with low precision tolerances and yet retain the ability of fine flow control.

As tested in working models, the valve of the present invention can be operated in excess of several thousands of times without failure. Preventive or periodic maintenance is facilitated by the easy replacement of both active and passive parts of the valve.

The valve of the present invention can be operated remotely from a controlling device. For example, this allows the valve to be closer to an actuator or a storage tank, and therefore to minimize dead space in conduits under pressure. This also allows an operator or a controlling device to be positioned away from a wet, hazardous, or dirty operating area. Yet the valve can be operated manually directly to bypass the action of the controlling device, for testing, emergency, or other reasons.

Two similar valves of the present invention can be paired together to create a three-way valve. The three-way valve embodiment of the present invention has been successfully used to control the actuators of an autonomous walking robot, where most of abovesaid qualities are required.

Still further objects and advantages will become apparent from a consideration of the ensuing summary, drawings and detailed description.

SUMMARY OF THE INVENTION

A two-way flexible valve is provided to control or interrupt the flow of a medium. The valve comprises a semi-rigid length of tubing that has been kinked by bending it until the material has yielded in an irreversible manner. Ulterior flexions of the tubing then tend to take place about the preferred axis set by the kink. An acute angle will close the valve by crimping the lumen shut, whereas an obtuse angle will open it, in some proportion of the angle. One end of the kinked valve tubing is held by a fitting on a support, and the other end is held by a fitting fastened to a lever hinged on pivot pins. The distance between holding fittings and the valve kink itself is several times the diameter of the valve tubing, and the axis of the kink is collinear with that of the hinge, both factors reducing stress in the valve material and increasing its lifespan. An elastic member holds the valve closed, and a flexible actuating line acting against the elastic member opens the valve in some proportion of its pull. The valve is simple, inexpensive, robust, of low maintenance, and because of its semi-rigid material, can withstand pressures higher than most flexible valves. A three-way valve embodiment is detailed for the control of a robotic actuator.

BRIEF DESCRIPTION OF THE DRAWINGS

FIG. 1A is a perspective view of a two-way hinged kink valve module set for normally closed operation, constructed in accordance with and embodying the features of the main embodiment of the present invention, and illustrating the valve in an intermediate state between open and closed condition;

FIG. 1B is a perspective view of a two-way hinged kink valve module set for normally closed operation, as a variant of valve depicted in FIG. 1A, also illustrating the valve in an intermediate state between open and closed condition;

FIG. 2 is a perspective view of a dual valve module set as a three-way valve for a pressurized gazeous medium in accordance with a second embodiment of the present invention, and illustrating inlet-to-common valve open and common-to-exhaust valve closed.

List of Reference Numerals 10 two-way hinged kink valve module
10' a variant of the same
11 molded valve support
11' metal valve support
12 pivot brackets (a,b,c)
13 pivot holes (a,b,c)
14 actuating lever
15 lever handle
16 lever arms (a & b)
17 lever pivot pins
18 elbow union fitting
19 compression coupling
20 semi-rigid tubing
21 static fitting
22 static fitting bracket
23 valve member
24 valve kink
25 first port of two-way valve
25a inlet port of three-way valve
25b exhaust port of three-way valve
26 second port of two-way valve
27 elastic member
28 attachment hook
29 actuating flexible line
30 actuating rotational shaft
31 coiled spring
40 three-way valve module
41 semi-rigid tubing
42 T union fitting
43 common port of three-way valve
44 actuating shaft
45 shaft bearing
46 collar
47 actuating arms (a & b)
48 muffler

DESCRIPTION—MAIN EMBODIMENT

Referring to FIG. 1A, a two-way kink valve module, designated by the numeral 10, designed to control the flow of a medium, is shown to include parts 11 to 29 described as follows.

A support 11 molded of rigid material is a base for pivot brackets 12a and 12b, whose pivot holes 13a and 13b are collinear and define a hinge axis 13a–13b. A two-armed actuating lever 14 is mounted for movement about hinge axis 13a–13b. Lever 14 comprises a handle 15 generally parallel to hinge axis 13a–13b, two arms 16a and 16b generally perpendicular to the hinge axis, and two pivot pins 17a and 17b held within pivot holes 13a and 13b. Lever arms 16a and 16b are flexible and resilient enough that lever 14 can be removed as a whole from support 11 by merely squeezing the two arms 16a and 16b towards one another until pins 17a and 17b exit holes 13a and 13b, or conversely, installed back on support 11 by the same action.

An elbow union fitting 18 is fastened by permanent means to lever 15 so that the prolongation of the axis of one end of the fitting intersects hinge axis 13a–13b at a right angle and so that the axis of the other end of the fitting is generally parallel to the hinge axis. This latter end is connected by a compression coupling 19 to a semi-rigid tubing 20 that is long enough to be free to follow the movements of lever 14 when this lever is moved about hinge axis 13a–13b. A static fitting 21 is fastened by permanent means to support 11 by a bracket 22 so that the prolongation of the axis of one of its ends intersects hinge axis 13a–13b at a right angle at the same location of the intersection described above, that is of one of the axes of elbow fitting 18 and the same hinge axis.

A generally tubular valve member 23 is the active part of the valve module 10 and is made of semi-rigid plastic material selected from the group consisting of polyethylene, polypropylene, their fluorinated derivatives, and nylon. Use of semi-rigid material made from recycled products should be avoided in valve member 23 as it may then contain impurities that can alter the behavior of the material in unpredictable ways. A kink 24, that is a permanent and irreversible alteration of the structure of the semi-rigid material is created by a sharp bending of valve member 23 and usually leaves a visible crease on its surface. As a result, valve member 23 comprises two branches articulated about kink 24. As a consequence of kink 24, valve member 23 will be easier to bend about the general axis of kink 24 than about any other axis or if the semi-rigid material were still intact.

Valve member 23 is connected by compression couplings 19 to fittings 18 and 21 so that the distance between couplings 19 and kink 24 is several times the diameter of valve tubing 23, and so that the orientation of kink 24 is generally collinear with hinge axis 13a–13b. Subsequent flexions of valve member 23 in valve module 10 will occur at kink 24, which will stay collinear with hinge axis 13a–13b. This geometric configuration minimizes the stress that could be induced by torques applied about any other axes than the kink axis. The combination of the valve member 23 being held away from the direct vicinity of the kink, with the semi-rigid nature of the two branches of the valve confers to it a self-aligning property. This property can compensate for slight misalignments during manufacture or after maintenance and contributes further to the reduction of stresses at the site of the kink. Kinks in tubing are generally considered as undesirable, and many patented devices are actually designed to prevent them, especially because side-loads at the kink can then weaken the material to the point of tearing. However, the geometric arrangement described above makes the valve of the present invention practically immune to tearing, and of unexpectedly long lifespan.

Two-way valve module 10 possesses two ports, a first port 25 at the unconnected end of semi-rigid tubing 20, and a second port 26 at the unconnected end of static fitting 21. Between ports 25 and 26, the connecting sequence of conduits 20, 18, 23 and 21 (or the opposite sequence) creates an uninterrupted passage for the flow of a medium, except at the location of kink 24 on valve 23, where the actual area of the lumen depends on the angle of the two branches of valve member 23, that is, that of lever 14 relative to support 11.

An elastic member 27 selected from the group of helical tension springs and rubberlike materials is taut between handle 15 of lever 14 and an attachment hook 28 fastened to support 11, so that it can crimp shut and maintain valve 23 in a closed condition at the highest working pressure of the medium within the valve. Attachment hook 28 is positioned further away from support 11 than is hinge axis 13a–13b to ensure that elastic member 27 will be in proper alignement to pull back on lever 14 when the latter is fully extended and handle 15 is in contact with support 11.

Finally, valve module 10 includes a flexible actuating line 29 attached to handle 15 of lever 14 so that pulling on the line elongates elastic member 27 and opens valve 23 in some proportion of the amount of the pull. Pulling of actuating line 29 can be exerted manually or by some control device (not shown) which can be located at a great distance from the valve, eventually through the use of devices from the group consisting of pulleys and low-friction guiding tubes (not shown).

Operation—Main Embodiment

The kink valve module 10 is operated by the single action of the amount of pulling on flexible line 29. When no pulling force is applied to actuating line 29, or if this line is flexed, valve member 23 is crimped shut by the action of elastic member 27. When a pulling force is applied to line 29, stretches it taut, and overcomes the resistance of elastic member 27, valve member 23 opens as some proportion of the amount of pull and allows the medium to flow through. Because kink 24 is itself a form of hinge, the forces necessary to operate lever 15 are light in comparison of the magnitude of the flow that can pass through the valve. The normal range of angles between the two branches of valve member 23 depends on the nature of the material it is made of and its wall thickness to diameter ratio but is generally between 45° (closed) and 135° (open). Extreme opening angles of nearly 180° can be used to blow out impurities or some emergency operation where a nearly full-bore opening is necessary, save for the irreversible residual deformation inherent to the presence of kink 24. Extreme opening angles should be avoided in normal operations, as they weaken kink 24 and shorten the life of valve member 23. If line 29 is flexed or not under tension, valve member 23 can nevertheless be opened manually by direct operation of handle 15, for example for testing, impurity blow-off, or emergency purposes.

One of the significant advantages of the invention is the ease of replacement of the parts for maintenance or repair. Changing elastic member 27, actuating line 29, or valve member 23 can easily be performed by removing pivot pins 17a and 17b from pivot holes 13a and 13b. Couplings 19 on fittings 18 and 21 can be of the quick-release type to facilitate that task.

Description and Operation—Variant of Main Embodiment

Referring to FIG. 1B, a two-way kink valve module variant of that illustrated in FIG. 1A, designated by the numeral 10', designed to control the flow of a medium, is shown to include the parts 12a to 26 already shown in FIG. 1A, and further to include parts 11', 12c, 13c, 30, and 31 described as follows. For brevity and clarity, only those parts differing from those of FIG. 1A will be mentioned.

A support 11' is made of sheet metal, as opposed to molded support 11 of FIG. 1A. Pivot brackets 12a, 12b, and 12c are made by stamping out and bending portions of support 11'. Bracket 12c is located so that all pivot holes 13a, 13b, and 13c are aligned, now defining a hinge axis 13a–13c. Static fitting brackets 22 are also stamped out and bent portions of support 11'.

Pivot pin 17b of FIG. 1A is prolongated axially beyond pivot hole 13c to become a rotational shaft 30, and to replace flexible line 29 of FIG. 1A as primary actuating means of the valve. Elastic member 27 and its attachment hook 28 of FIG. 1A are replaced by a coiled torsional spring 31 set around shaft 30 between pivot brackets 12b and 12c so that it urges lever arm 16b to close valve 10'. Finally, couplings 19 of FIG. 1A are replaced by more conventional friction means.

Valve 10' can be operated either by actuation of shaft 30 through the use of a manual knob (not shown) or a controlling device (not shown), or it can be operated manually by handle 15.

Description and Operation—Second Embodiment

Referring to FIG. 2, there is illustrated a three-way valve module 40, which includes two kink valve modules 10a and 10b arranged in a parallel, side-by-side relationship. Each of the kink valve modules 10a and 10b are substantially identical to module 10 described in connection with FIG. 1A, except that there is a single support 11a resulting from the juxtaposition and expansion of their two individual supports 11. In addition to the respective parts of valves 10a and 10b, three-way valve module 40 includes parts 41 to 48 described as follows. For brevity and clarity, only those parts differing significantly from those of FIG. 1A will be mentioned.

A semi-rigid tubing 41 connects second ports 26 of valves 10a and 10b to two branches of a union T fitting 42. The third branch of T fitting 42 is a common port 43 for three-way valve 40. Common port 43 can be connected to some hollow entity of which volume or pressure is to be controlled, in particular to a fluid powered robotic actuator (not shown). A shaft 44 is free to rotate in a shaft bearing 45 fastened to support 11a on a median line between valves 10a and 10b. A collar 46 with two approximately diametrically opposed arms 47a and 47b is fastened to shaft 44. Actuating flexible lines 29 of valves 10a and 10b are attached to arms 47a and 47b, respectively. Shaft 44 can be positioned at a great distance from valves 10a and 10b, with flexible lines 29 guided through devices from the group consisting of pulleys and low-friction tubes (not shown).

First port of valve 10a is an inlet port 25a of three-way valve 40 and is connected to a source of pressurized medium (not shown). First port of valve 10b is an exhaust port 25b of valve 40 and is connected to a drain (not shown) at a lesser pressure than that of the inlet port. If the medium is compressed air or a gas authorized for atmospheric venting, port 25b can be left open directly to ambient air, or as shown in FIG. 2, through an optional muffler 48.

Operation of the three-way valve is determined by the amount of rotation of shaft 44, which can be actuated manually through a knob (not shown), by a servomechanism or some other controlling device (not shown). When arms 47a and 47b are in a neutral position, the lengths of actuating lines 29 are long enough that both valves 10a and 10b are held closed by their respective elastic members 27. When shaft 44 rotates counterclockwise, as shown on FIG. 2, arm 47a pulls opens valve 10a in some proportion of the amount of rotation of the shaft, but arm 47b has no effect on closed valve 10b as its line 26 is not under tension and is flexed. As a consequence, the medium can flow from inlet port 25a to common port 43. Conversely, clockwise rotation of the shaft allows the medium to flow from common port 43 to exhaust 25b and muffler 48. As described, valves 10a and 10b cannot open simultaneously, and the medium cannot flow directly from inlet port 25a to exhaust port 25b.

Conclusion, Ramifications and Scope

Thus it can be seen that the kink valve of the present invention provides a simple two-way flexible valve, inexpensive in both manufacture and maintenance, with a continuously adjustable flow. The valve has little obstruction to the flow in its open state, and has a self-cleaning ability. It can be operated at pressures higher than generally used in flexible valves. The valve possesses self-aligning properties that facilitate its manufacture and extend its lifespan, which exceeds thousands of operations. It can be operated remotely by a controlling device as well as manually. The three-way version is well suited to the control of a robotic actuator.

While the above description contains many specificities, these should not be construed as limitations on the scope of the invention, but rather as an example of one preferred embodiment thereof. For example, some parts described as separate and fastened together can be manufactured as a single piece, for example, support 11 with pivot brackets 12a & 12b with bracket 22 with static fitting 21, or handle 15 with elbow fitting 18;

although valve module 10 in FIG. 1 is set as a normally closed valve, it can be set as normally open by merely switching the action of elastic member 27 and actuating line 29;

cross-section of valve member 23 can be oval instead of circular to facilitate preferential bending and its ensuing kink;

three-way valve can be a mix of components from valve 10 and valve 10';

the flows in three-way valve module 40 can be reversed or changed to fit another purpose than that of controlling an actuator.

Accordingly, the scope of the invention should be determined not by the embodiments illustrated, but by the appended claims and their legal equivalents.

What is claimed is:

1. A two-way valve apparatus for controlling the flow of a medium, comprising:

(a) a generally flat support made of rigid material, with two pivot brackets mounted on said support with pivot holes oriented so that the axes of said pivot holes are collinear and thereby define a pivotal axis generally parallel to said support, (b) a lever comprising an elongated handle prolongated at approximately right angle by two lever arms, with each of said lever arms terminated by a pivot pin approximately parallel to the longitudinal axis of said handle, with said pivot pins inserted in said pivot holes so that said lever can hinge about said pivotal axis, (c) an elbow tubular fitting fastened to said handle so that the prolongation of the axis of one of its ends intersects said pivotal axis at a right angle, and the axis of its other end is approximately parallel to said pivotal axis, (d) a port tubing made of semi-rigid material coupled to the latter end of said elbow fitting, and long enough that said tubing is free to follow said lever when lever is moved about said pivotal axis, with the other end of said port tubing constituting the first port of said two-way valve, (e) a static tubular fitting mounted on said support through a fitting bracket so that the prolongation of the axis of one end of said static fitting intersects said pivotal axis at a right angle at approximately the same location of the intersection described in (c) above, and the other end of said static fitting constituting the second port of said two-way valve, (g) a generally tubular valve member made of semi-rigid plastic material selected from the group consisting of polyethylene, polypropylene, their fluorinated derivatives, and nylon, in which an irreversible kink has been made by hyperflexion of said valve member, where said kink can restrict the lumen of said valve member as some function of the angle of flexion of said valve member, and where said kink can shut close the lumen when the valve angle is in an extreme acute position, (h) couplings fastening said valve member between said elbow fitting and said static fitting so that the general axis of said kink is approximately collinear with said pivotal axis, and so that said valve flexion angle can be changed by rotation of said lever about said pivotal axis, thereby said valve apparatus provides a continuous medium-tight passage which can throttled at the location of said kink in some proportion of the angle of said lever relative to said support.

2. A valve apparatus as claimed in claim 1 further comprising a linear elastic member stretched between said handle and a fastening attachment on said support so that said elastic member is urging said lever to bring said valve angle to an extreme acute or extreme obtuse position, thereby creating a normally closed or normally open two-way valve.

3. A valve apparatus as claimed in claim 1 further comprising an axial prolongation of one of said pivot pins so that it can be used as a rotational shaft for said valve, thereby providing means for direct actuation of said valve.

4. A valve apparatus as claimed in claim 3 further comprising a torsional elastic member acting about said actuating shaft on said lever arm connected to said shaft so that said elastic member is urging said lever to bring said valve angle to an extreme acute or extreme obtuse position, thereby creating a normally closed or normally open two-way valve.

5. A valve apparatus as claimed in claim 4 further comprising a flexible line tethered to said handle of said lever so that exerting a linear traction on said line creates a rotational motion of said lever about said pivotal axis, thereby providing the means to actuate said valve remotely.

6. A valve apparatus as claimed in claim 1 further comprising a flexible line tethered to said handle of said lever so that exerting a linear traction on said line creates a rotational motion of said lever about said pivotal axis, thereby providing the means to actuate said valve remotely.

7. A valve apparatus as claimed in claim 1 wherein said support, said pivot brackets, and said fitting bracket are molded as one piece of the same material.

8. A valve apparatus as claimed in claim 1 wherein said port tubing, said elbow fitting, said valve member, and said static fitting consist of a same semi-rigid tubing, where said elbow fitting has been formed by heat treatment.

9. A valve apparatus as claimed in claim 1 wherein said support, said pivot brackets, and said fitting bracket are stamped out and folded out of a same sheet of metal.

10. A valve apparatus as claimed in claim 1 wherein said lever and said elbow fitting are manufactured as one piece of the same material.

11. A valve apparatus as claimed in claim 1 wherein said fittings possess couplings selected from the group consisting of barbed, compression and quick-disconnect couplings.

12. A valve apparatus as claimed in claim 1 wherein said lever arms are resilient enough so that said pivot pins can be inserted in said pivot holes by manual flexion of said arms.

13. A method for creating a two-way valve controlling the flow of a medium, comprising the steps of:

(a) creating an irreversible kink in a tubing made of a semi-rigid material by hyperflexion of said tubing until it yields and creates a preferential flexion axis in said tubing, (b) fastening said tubing on a lever comprising pivot pins and on a support comprising pivot brackets, with said pivot pins hinged in said pivot brackets defining the pivotal axis of said lever, so that said flexion axis is collinear with said pivotal axis, and so that said fastenings are located at least several tubing diameters away from said kink, thereby the angle of said tubing will control the size of the lumen of said tubing, and thereby the angle of said lever relative to said support will act as a throttle in said two-way valve.

* * * * *